United States Patent [19]

Mourier

[11] 4,221,983
[45] Sep. 9, 1980

[54] ELECTRICAL MACHINE

[75] Inventor: Georges Mourier, Paris, France

[73] Assignee: Thomson CSF, Paris, France

[21] Appl. No.: 905,352

[22] Filed: May 12, 1978

Related U.S. Application Data

[63] Continuation of Ser. No. 595,096, Jul. 11, 1975, abandoned.

[30] Foreign Application Priority Data

Jul. 16, 1974 [FR] France ............................ 74 24667

[51] Int. Cl.$^2$ ........................................... H02K 11/00
[52] U.S. Cl. .................................... 310/72; 318/794
[58] Field of Search ................ 310/72, 166, 183, 210, 310/211, 212, 171, 168-172, 103, 68-71; 318/220-225, 238, 121, 135

[56] References Cited

U.S. PATENT DOCUMENTS

| 911,147 | 2/1909 | Mershon | 318/238 X |
| 2,706,269 | 4/1955 | Kazan | 310/72 X |
| 3,875,484 | 4/1975 | Williams et al. | 318/220 R |

Primary Examiner—Donovan F. Duggan
Attorney, Agent, or Firm—Roland Plottel

[57] ABSTRACT

An electrical machine operating at radio frequencies, which comprises a stator S and a rotor R displacing in relation to the latter, for example in a rotational motion. The rotor comprises oscillatory circuits at the rate of one per pole. In a variant embodiment, the stator is designed as a low-pass filter made up of inductors in series between two conductors, capacitors and a common conductor. Commencing from a certain rotational speed on the part of the rotor which is driven by a motor, power amplification takes place between the input and the output of the filter.

22 Claims, 15 Drawing Figures

PRIOR ART

ELECTRICAL MACHINE

This is a continuation of application Ser. No. 595,096, filed July 11, 1975, now abandoned.

The present invention relates to a novel type of electrical machine.

Like prior art machines, the machine in accordance with the invention comprises two parts. As is customary, one of these parts will be referred to hereinafter as the stator and the other as the rotor, although this latter could execute in relation to the stator which is fixed, a motion other than the rotary motion which it conventionally performs in known machines, for example a translatory motion.

As in the prior art machines, the machine in accordance with the invention is capable of operating either as a generator furnishing current after the manner of an alternator for example, when the rotor is driven by a motor, or as a motor driving a load connected to a rotor. In a variant embodiment of the first case, part of the currents in the machine may be furnished by one or more external sources; in which event the machine will operate as an amplifier, converter, etc.

As in prior art electrical machines, electrical elements of the stator and the rotor of the machine in accordance with the invention, will be localised at zones referred to as poles. Again as in the prior art machines, the coupling between stator and rotor will take place in the region of said poles by a mechanism of magnetic induction or through the electric field developed there.

The machine in accordance with the invention is distinguished, however, from the electrical machines with stator and rotor of prior art kind, by the essential feature that the rotor always comprises both windings, or inductors, and elements which accumulate electrical charges, the coupling between the rotor and the stator taking place either between said windings, through magnetic induction, or between the electrical charge accumulating elements, by electrical influence, and corresponding stator elements.

According to the invention, there is provided an electrical machine comprising a fixed part, or stator, and a rotor, both equipped with poles, said rotor displacing in relation to said stator in such a fashion that is poles pass in front of those of the stator, said stator and said rotor comprising electrical elements in each of their poles, through which the rotor poles are electromagnetically coupled with the stator poles at the instant at which they pass in front of each of same, said rotor comprising both inductors and elements which accumulate electrical charges, forming oscillatory circuits associated with each of said rotor poles, at the rate of one circuit per pole, said oscillatory circuits being localised in part at least within said rotor poles, said stator comprising reactive elements, localised in part at least within said stator poles, said reactive elements being connected between two conductors.

For a better understanding of the invention and to show how the same may be carried into effect, reference will be made to the following description and the attached drawings, where.

Equations (1) to (18) used in the description are given at the end of the text of the description.

In the figures, the electrical supply sources for the machine have not been shown. The connection of these sources takes place in accordance with the known dispositions utilised with electrical machines, taking into account the special arrangements which are due to the high frequency nature of these sources when such is the case.

In some of the embodiments hereinafter described, the characteristics of the invention are those of microwave tubes and in particular travelling wave tubes. In these variant embodiments, the machine in accordance with the invention can be a machine having a wide frequency band. It will be noted, however, that for technological reasons the operating frequencies of the machine in accordance with the invention are, unless special dispositions are resorted to, substantially lower than those of the microwave tubes referred to.

Also worthy of note is the feature of the machine in accordance with the invention, according to which, in the case of a rotor driven by a motor, that is to say a machine operating as a generator, the speed of the moving part, as it were the equivalent of the electron beam in the kinds of travelling wave tubes to which reference has been made earlier, remains constant throughout the whole of its displacement past the stator, in contrast to the case with said beams whose velocity diminishes from the input towards the output of the tubes and in which the efficiency accordingly only reaches its peak in a narrow zone of the beam trajectory where the velocity attains the optimum value.

The simplified theory of the machine in accordance with the invention and set out hereinafter, deals with the particular case of a current-amplifier machine with a stator in the form of a filter.

Figure 2:
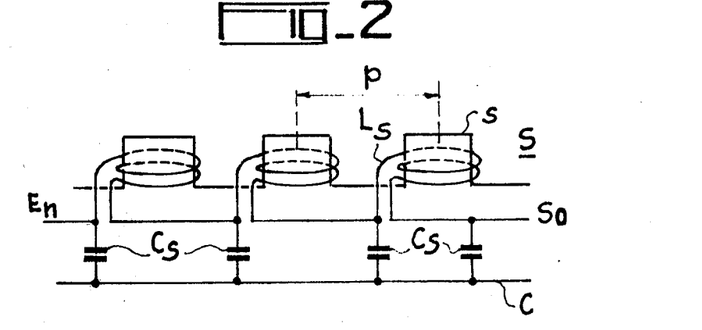
FIG. 2 is a diagram of an example of a stator belonging to a machine in accordance with the invention.
Figure 3:
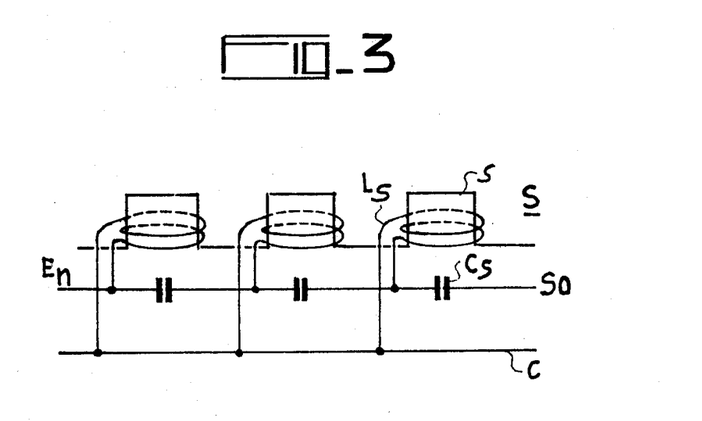
FIG. 3 is a diagram of another embodiment of a stator belonging to a machine in accordance with the invention.

In the theory which is developed hereinafter, it will be assumed that the stator S is designed as a low-pass filter made up of networks arranged in the manner indicated in the diagram of FIG. 2, utilising capacitors $C_s$ connected in the manner indicated in the figure in relation to the inductors $L_s$ which are wound around the poles S of the stator, and to the common conductor c. The stator, which in the example of the figure has a linear form, has an input and an output respectively marked En and So. FIG. 3, with the same linear disposition, illustrates another example of the stator, this time as a high-pass filter.

Figure 4:
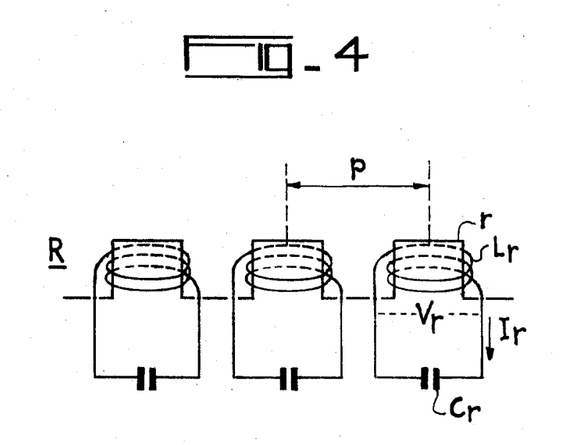
FIG. 4 is a diagram of a rotor of a machine in accordance with the invention.

It will be assumed, furthermore, that the rotor R comprises a series of oscillatory circuits separated from one another and each comprising a capacitor $C_r$ connected in series with an inductor $L_r$ wound around a pole r in the manner shown in FIG. 4.

Figure 1:
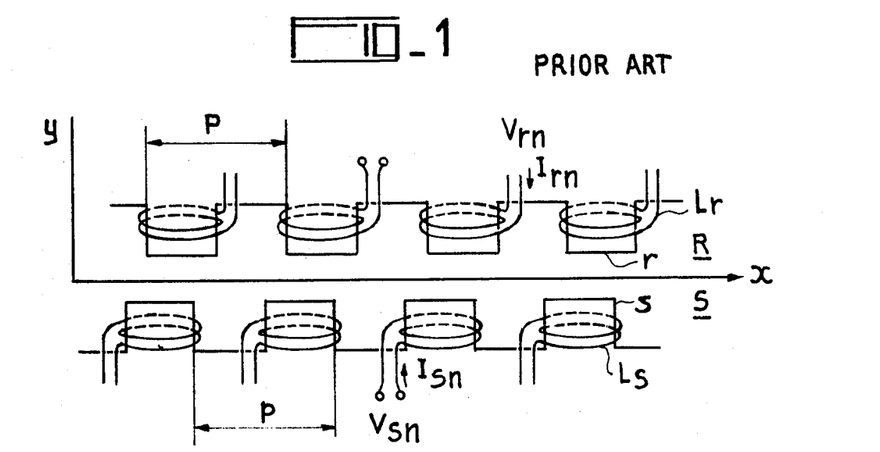
FIG. 1 is a diagram of a prior art electrical machine.

The equations which govern the operation of this kind of machine are:

I—the conventional ones defining machines of prior art design, whose schematic structure has been outlined in FIG. 1 where the rotor and the stator located opposite one another, have been illustrated for reasons of clarity, as in the figures considered earlier, with a line structure. These equations are developed from a consideration of the inductances $L_s$ and $L_r$ and the coefficient of mutual inductance M and on the assumption that the variations in said inductances and in said coefficient of mutual inductance are negligible to either side of the stator poles during the course of the movement of the rotor poles past them. These equations are the equations (1), (2), (3) and (4) in which $I_s$ and $I_r$, $V_s$ and $V_r$ are the instantaneous values of the currents and voltages at the moment at which said transit occurs, and $\phi$ signifies the magnetic fluxes, it being understood that each of the indices s or r must itself be assigned an index n which has been deliberately omitted for simplicity's sake, n representing the order of the winding in question, in the set of which it forms part, see FIG. 1. $\omega$ and $\omega_3$ represent the radian frequencies of the currents flowing through the stator and the rotor respectively. It will be remembered that these radian frequencies are generally different in rotor and stator. Assuming, for example, in accordance with the diagram of FIG. 1, that the poles of the stator and the rotor are regularly spaced with the same spatial periodicity, that is to say the same pitch p in the two parts of the macine, and assuming that the machine operates under conditions such that the phase-shift between two successive poles is the same in both stator and rotor, said two radian frequencies are related by the expression (5) where $\beta$, in accordance with the usual convention, represents the propagation constant of the magnetic field wave or current wave along the stator. The relationship: $\beta = 2\pi/\lambda = \omega/v_{100}$ applies, $\lambda$ and $v_{100}$ respectively signifying the wavelength and phase velocity of said wave and $\omega$ its radian frequency ($\omega = 2\pi f$, where f is the frequency); u is the velocity with which the rotor passes in front of the stator in the direction of the fixed reference axis x, associated with the stator, of the example shown in FIG. 1; each component of radian frequency $\omega$ varies with time and along the axis x in proportion with $j(\omega t - \beta x)$, adopting conventional complex notation.

Figure 5:
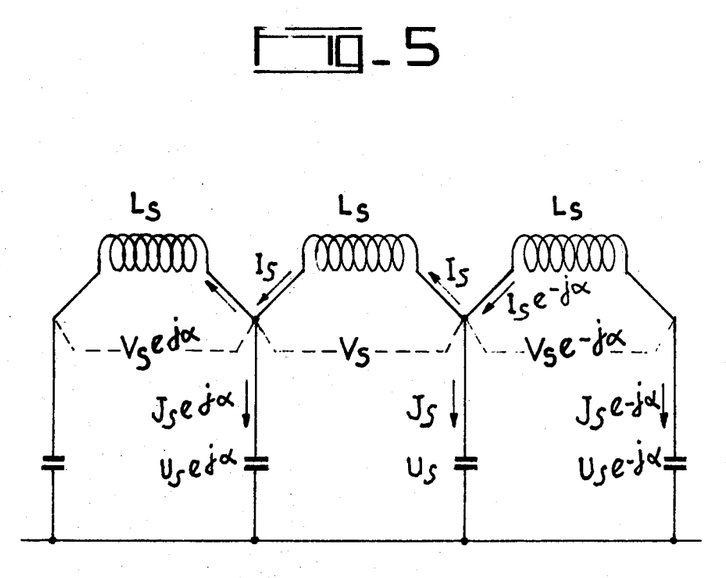
FIG. 5 is a diagram associated with the preceding diagram, showing the significance of the notation used.

This latter expression (5) quite simply indicates the change in coordinates which is required in passing from the fixed system of axes of the stator to the moving system of axes of the rotor, during the aforesaid displacement ($\omega$ is zero in the case of a synchronous machine; this corresponds to values of $v_{100}$ and u which are identical, taking the earlier hypotheses). As far as the previous hypothesis of equality of phase-shifts is concerned, this having been adopted in order to provide a starting point, this in no way limits the general character of the expressions for the fluxes and voltages, constituted by equations (1) to (4). II—and the equations peculiar to the machine in accordance with the invention, with its stator and rotor, as illustrated in FIGS. 2 and 4 respectively, said equations being written in accordance with the notations of FIG. 4 in the case of the rotor and with those of FIG. 5 in the case of the stator, namely equations (6) and (7), the latter being obtained by putting $\alpha = \beta \cdot p$ ($\alpha$ representing the phase-shift between two adjacent poles), and noting that:

$$I_s = \frac{-J_s}{1 - \exp(-j\alpha)}$$

and $V_s = U_s(1 - \exp j\alpha)$ where $$U_s = -j \frac{J_s}{C_s \omega}$$

the different symbols being those shown in FIG. 5.

Eliminating $V_r$ and $V_s$ between the equations (3), (4), (6) and (7), the two equations (8) and (9) are obtained which, uniform in terms of $I_s$ and $I_r$, are subjected to the compatability condition (10), this being the characteristic equation of the machine and simplifying to (11) if $\alpha$ is small $(1 - \cos\alpha \sim \alpha^2/2)$, that is to say if there is a large number of phases in the electrotechnical sense of the word.

This latter equation identifies with the equation (7.10) for travelling wave tubes, given by J. R. Pierce on page 113 of the publication "Travelling Wave-Tubes" from Van Nostrand Co., 1950, if we make a certain number of changes in variables which are rendered necessary by the differences in the notation employed above and those used by Pierce, and of course within the limits of the hypotheses made by Pierce.

It will be recalled, first of all, that in the theory of travelling wave tubes, it is necessary to introduce two special values of the variable $\beta$, namely the value of $\beta$ in the absence of a beam, conventionally designated by $\beta_o$ and known as the circuit propagation factor, and the value $\beta_e$, or phase constant, which corresponds to the beam velocity; the relationship $\beta_e = \omega/u$, where u has the meaning described earlier, holds.

In the case of the machine described hereinbefore, $\beta_o$ is the value of $\beta$ as given by the equation (10) in the case where the rotor capacitance $C_r$ is infinite. The condition $$\beta_o^2 = \frac{L_s C_s \omega^2}{p^2}(1 - \frac{M^2}{L_r L_s})$$

is obtained. The equation (10) then takes the form (12).

The values of $\beta$ which are given by this equation are of course different from $\beta_o$. They may be complex, as in travelling wave tubes, their real part defining the amplification as expressed by the formula for the wave components, $j(\omega t - \beta x)$, given hereinbefore. A very high amplification factor can be achieved without $\beta$ differing very much from $\beta_o$ in absolute value.

The changes is variables, which are involved, are: $\Gamma = \beta j$, $\Gamma_l = \beta_l \cdot j$, since $\beta_l = _o$, $\beta = \beta_e + j \cdot \beta_e \cdot C \cdot \delta$ and for the line propagation factor in particular we obtain $\beta_o$, $\beta_o = \beta_e - j \cdot \beta_e \cdot Cd + \beta_e \cdot Cb$, when $\delta$ adopts the special value $\delta = -d - bj$ and those given in the equations (13) and (14).

As far as the hypotheses made by Pierce are concerned, these consist in the assumption that if $\beta$ and $\beta_o$ differ very little from $\beta_e$, the modulus of $\delta$ is of the order of unity, the quantities b and d themselves having values ranging between zero and unity if C is very substantially less than 1.

In the case of electrostatic coupling between the rotor and the stator, instead of the magnetic coupling described earlier, an equation would be arrived at which would be similar to that (11), by tranposing $L_r$ and $C_r$ on the one hand and $L_s$ and $C_s$ on the other, and by substituting for the coefficient of mutual inductance M the coefficient of electrostatic influence conventionally used in coupling between capacitances.

This coupling is effected between the whole or part of the capacitances of the stator and the rotor, which capacitances are located at the poles of said elements.

Although the characteristic equation of the machine for the situation in which the stator does not take the form of the filter specified earlier, its elements instead being arranged in separate circuits which are interconnected with one another, has not been given here, it should be pointed out that in this case, the stator windings for example each being connected in series with a capacitor, it would be possible to pick off across the terminals of these circuits, with given phase-shifts, the alternating energy induced in them by the passage of the rotor. Further reference to this point will be made later on in the context of FIG. 9.

The identity between equation (12) hereinbefore referred to and the equation (7.10) obtained by Pierce, does not rule out certain differences between the machine in accordance with the invention and microwave tubes.

It will be noted in particular, and indeed this is one of their advantages, that the kinds of distortion which are due to non-linearity cannot occur in the machines in accordance with the invention except by saturation of either the magnetic materials or the dielectric materials used in the construction of these machines, all the described elements of which are furthermore linear.

On the other hand, as already mentioned, the rotor velocity is constant so tht the efficiency remains constant throughout the travel of the rotor past the stator and from one rotation to the next, in the case of a rotor which is performing a rotational motion, in contrast to what happens, as described earlier, in microwave tubes and in particular in travelling wave tubes. The consequence of this is that the machine has a higher efficiency than travelling wave tubes. In addition, in microwave tubes there is a substantial fraction of the electron beam energy which is not utilised; this fraction is that represented by the kinetic energy of the electrons reaching the collector. This kind of loss does not exist in the machine in accordance with the present invention.

The frequencies of operation of the machines in accordance with the invention may reach several kilocycles and, as already mentioned and for technological reasons, will be substantially less than those of microwave tubes but equal to or substantially higher than those of prior art rotary machines in which the frequency can be counted in terms of tens or hundreds of cycles. This makes it possible to apply machines in accordance with the invention to the yield of radio. Wth sufficiently small pitches, of the order of one millimetre, a speed u of 100 m/s and a phaseshift $\alpha$ of $\pi$, it is possible in the case of a synchronous machine to attain a frequency of the order of 50 kHz.

The reduction of the pitch makes it possible to still further increase the frequency. A particularly interesting technique where the reduction of the pitch is concerned, it to employ printed circuits using the masking techniques encountered in solid state work. Pitches of the order of a micron can be achieved by these methods. This kind of reduction in the dimensions lends itself well, furthermore, to very low temperature cooling so that super-conducting phenomena can be utilised and the Joule effect losses in the conductors of the machine reduced.

Considerable powers can furthermore be developed in the machines in accordance with the invention without coming up against the mechanical limitations presented by the prior art machines. In the machines in accordance with the invention, the only limits are those determined by the losses in the electrical circuits and in the magnetic and dielectric materials used.

In the variant embodiment of the invention, corresponding to the above stated hypotheses where the rotor and stator are solids of revolution about an axis such as that X, the machine is designed in the manner described hereinafter making reference to FIG. 6.

Around the poles 1 of the stator the windings 2 are arranged, connected in series between an input conductor 3 and an output conductor 4; capacitors 5, between the windings 2, connect the conductors 3 and 4 to a common conductor 6; (the input and output of the machine are symbolised by unmarked arrows directed respectively towards the right and towards the left in the figure, between the unmarked terminals of the conductor 6 and the conductors 3 and 4, as the figure shows.) The different networks of the stator S, thus created (low-pass filter as shown in the diagram of FIG. 2), are damped by resistive elements. These latter elements can be distributed amongst the networks as in FIG. 6, or combined in the form of two resistors 7 and 8 connected between the windings 2 and the common conductor 6, in the manner shown in the figure to the terminals of the capacitors 9 and 10. A zone 11 decouples the input and the output of the stator, between the conductors 3 and 4. In this zone, too, damping of oscillations in the rotor circuits is effected. In the example described, the rotor R is imparted a rotary motion about the axis X, in the direction of the arrow. The electrical circuits of the rotor take the form shown in FIG. 4. Their damping in the zone 11 can be effected by absorber elements insulated from the input and the output of the stator and arranged between the conductors 3 and 4, for example electrical circuits comprising resistors and coupled by mutual induction with the rotor circuits which are instantaneously situated opposite them. Other arrangements are possible of course. Another example of these arrangements is given in FIG. 7 where damping is achieved by means of the resistive element 12 assembled between two rails 13 and 14 upon which the terminals 15 and 16 of each rotor circuit wipe as the rotor passes through the sector 11. Thyristors can also be used for this purpose.

A machine of this kind can be used as a generator, the rotor being driven by a motor, in order to generate high electrical powers at a frequency of 50 kHz and with a wide pass-band of the order of 20 kHz. Output powers of 100 kW are readily achieved by amplification, with a gain of 40 dB between the input and the output of the stator, that is to say with a power input to the stator of 10 W. This kind of machine can be used as a high powered amplifier in radio broadcasting. Like the travelling wave tubes which have been referred to, this kind of machine constitutes a stable high-gain, wide-band amplifier.

The response time of the machine to pulses applied to the stator input, does not exceed 100 microseconds. Accordingly, the same machine can be utilised to produce without any switching in fact, heavy currents which can be varied extremely rapidly, for example in order to excite the magnetic circuits of thermonuclear fusion installations or to supply a particle accelerator such as a proton synchrotron.

Used as a motor, the same machine will develop high mechanical torques in order to drive a load through the rotor, which torques can be varied rapidly in accordance with a given programme and with a current supplied to the stator input. The variable currents required can themselves be furnished by a machine in accordance with the invention operating as an amplifier, with a high inertia rotor supplying the motor machine which itself has a low inertia rotor.

Those skilled in the art will be aware that in the neighbourhood of the synchronous state, generator or motor operation depends upon the slip factor g, that is to say the ratio of the difference between the synchronous speed of the rotor as defined hereinbefore, and its true speed, to the synchronous speed in question. For a zero or negative value of g, that is to say in the case of a rotor which is moving slightly faster than the synchronous speed, the machine will operate as a generator (or amplifier), whilst for a positive or zero value of g, it will operate as a motor giving the rotor a speed lower than the aforesaid speed. Taking the notation adopted as convention, we have $g = -Cb$.

These considerations relating to the factor g point up another property of the machine. Machines acting as motors, as described earlier, are capable of fast speed regulation within a wide range, by modification of the excitation frequency injected at the stator input, such injection being effected for example by a machine in accordance with the invention which is operating as a generator for example, or for that matter by any other prior art generator or amplifier. Stable operation of the machine when operated as a motor, at an excitation frequency $\omega_1$, is achieved in accordance with what has been said so far, for the condition $g \geq 0$, that is to say for a rotor speed u slightly lower than the phase velocity corresponding to the frequency $\omega_1$, in other words $\omega_1/\beta_1$. Let us assume that commencing from a certain instant the excitation frequency is given the value $\omega_2$ such that the corresponding phase velocity is less than u; since g becomes negative, the machine operates as an amplifier and the rotor is braked until its speed again becomes less than said phase velocity. However, whereas in the prior art machines the energy released during this braking operation is returned towards the input, in the machines in accordance with the invention, and this indeed is another of their advantages, it is directed to the electrical load arranged at the stator output, the stator being terminated in its characteristic impedance.

One of the possible applications is the design of motors of high speed stability, by arranging for the stator to be supplied from a source which is frequency stabilised by crystal control for example. A speed of 6000 rpm is obtained with a rotor 30 cm in diameter, a pitch of 0.01 mm and a stator input supply operated at a frequency of 4.7 MHz approximately.

Figure 6:
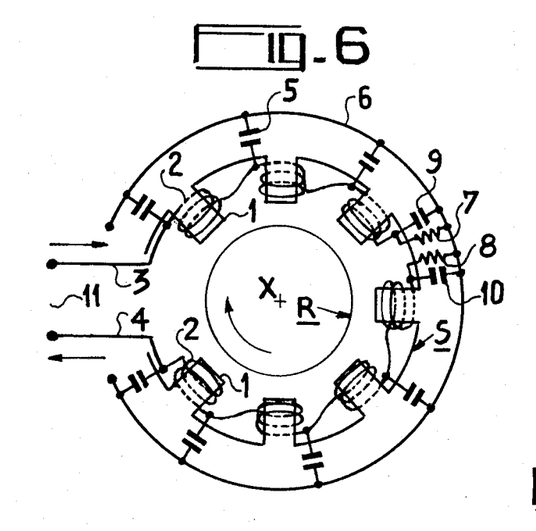
FIG. 6 is a schematic view of a variant embodiment of the machine in accordance with the invention.
Figure 7:
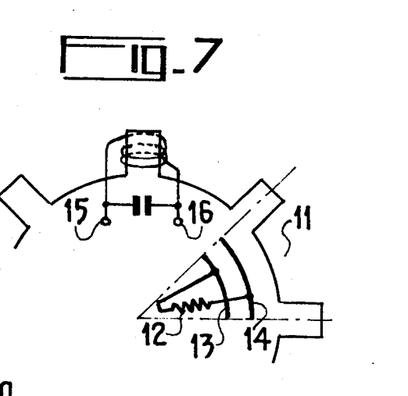
FIG. 7 is a detail of FIG. 6.

In a modified arrangement of the variant shown in FIG. 6, the stator is provided simply with the terminal networks, those located closest to the input and the output, the zone 11 being retained for the decoupling purpose referred to earlier. The machine will cease to operate by progressive amplification but will instead operate by transfer of energy from the input network to the output network in the manner of a klystron, the natural frequency of the oscillatory circuits of the rotor having to be chosen in such a fashion, as a function of the rotor speed, that the current in these circuits peaks at the instant at which they pass the output network.

Figure 8:
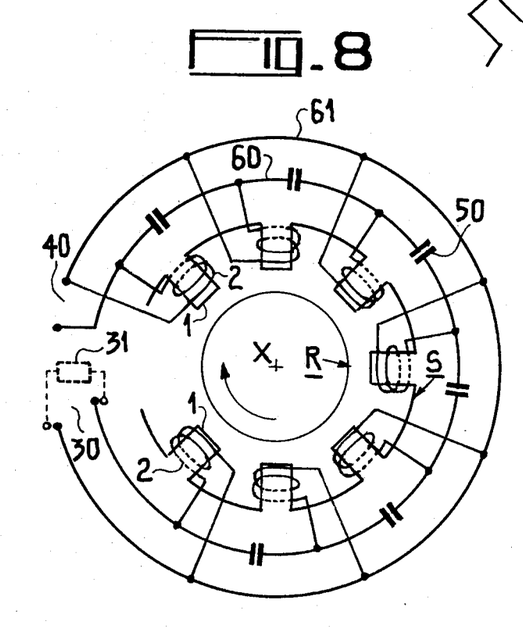
FIGS. 8 and 9 are schematic views of two embodiments of the machine in accordance with the invention.

In another variant embodiment, very similar to that of FIG. 6, the stator takes the form of the high-pass filter shown in FIG. 8.

The characteristic equation of the machine is in this case the equation (15) the principal difference on the part of which, relatively to equation (12) referred to earlier, is the sign of the second term. This variant embodiment is characterised, because of this sign, by a graph $\omega(\beta)$ the tangent to which at the working point has a slope of the opposite sign to that of the radius vector corresponding to said point: the group speed, being the slope of this tangent and the phase velocity, being the slope of said radius vector, have opposite signs at said point. This variant embodiment operates as an oscillator or a reverse wave amplifier with a narrow tuneable bandwidth. This variant embodiment has been shown schematically in FIG. 8 where similar references designate similar elements to those shown in FIG. 6. In contradistinction to said latter figure, the arrangement of FIG. 8 comprises two conductors 60 and 61 to which the windings 2 are connected in the manner indicated. The capacitor 50 is arranged in the conductor 60 between two successive inductors 2. It should be pointed out that in this case, in contrast to that of FIG. 6, the reverse wave mode of operation makes it necessary to arrange the output of the amplifier at the end 40 and the input of the amplifier at the other end 30, between the terminals of the conductors 60 and 61. For an oscillator, said end 30 would be terminated in the characteristic impedance 31 of the stator, shown in broken line in the figure. In this latter arrangement, the machine can be utilised as a motor with a stator supplied at 40.

A consideration of equation (3) and (4) and of the equation for the circuits of the rotor in accordance with the invention, with coil and capacitor as in the case of FIG. 4, which equation can be written $$V_r = \frac{J}{C_r \omega} I_r$$

points up another general property of the machine in accordance with the invention. By eliminating $V_r$ and $I_r$ between the three equations, the equation (16) is obtained, which, taking the same notation as before and introducing the quantity $\omega_r$, gives us the impedance $Z_s = V_s / I_s$ at the stator terminals; $\omega_r$ is the individual radian frequency of each of the rotor circuits of FIG. 4, all of which are identical; the condition $\omega_r^2 \cdot L_r \cdot C_r = 1$ holds. It will be seen that the impedance $Z_s$ can be varied even if the frequency $\omega$ is fixed, that is to say the radian frequency of the stator is fixed. With a fixed value of $\omega$, the impedance depends upon the value of $\omega_r$, in relation to $\omega_3$.

With $\omega$ and $\omega_r$ fixed, that is to say for a given machine whose stator is supplied at a fixed frequency, it is possible to vary the stator impedance by varying the radian frequency $\omega_3$, that is to say by varying the rotor speed in accordance with what has been stated earlier (equation 5), this within very wide limits due to the form of the expression for $Z_s$ which can in particular achieve extremely high values, when the values of $\omega_3$ are close to $\omega_r$. It is thus possible, using the machine in accordance with the invention with a fixed stator frequency, to feed into load impedances connected to the stator output, which vary within very wide limits, this by varying the rotor speed. This property of the machines in accordance with the invention can be utilised in particular in order to effect high frequency heating without modifying the stator conditions when changing from one object to another; it is only the rotor speed which has to be modified in order to take account of load variations. This speed can be made dependent upon the load in question. The same equation (15) shows that it would be possible to achieve the same result with a constant rotor speed, by modifying the frequency $\omega_r$, that is to say for example by switching to different capacitances $C_r$. The amplifier version of the machine described earlier (FIG. 6), is suitable for this application.

Figure 9:
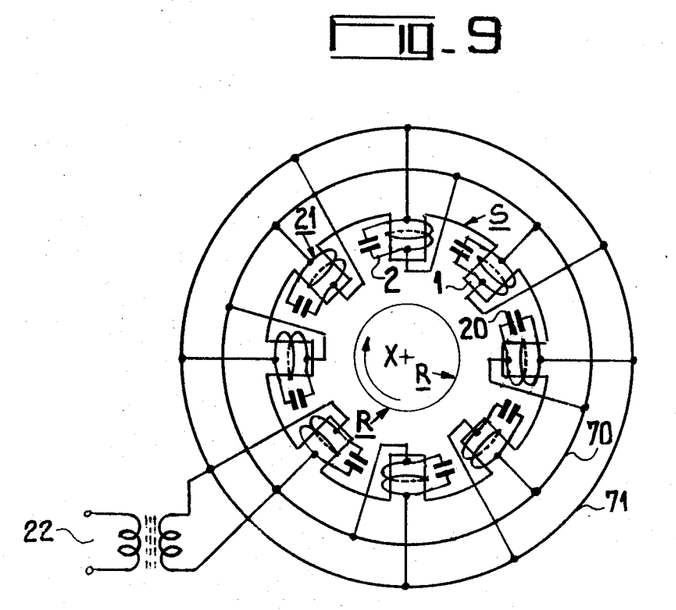

In another variant embodiment of the machine in accordance with the invention, the stator also comprises oscillatory circuits: each winding is shunted across a capacitor in accordance with the schematic example shown in FIG. 9, where the oscillator circuits are separated from one another, where the reference 1 designates the poles and the reference 2 the stator windings, and where 20 signifies the capacitances in question. The reference 21 is used to designate each of the stator oscillatory circuits thus created. These circuits are connected together by conductors 70 and 71 in a two phase arrangement in the case shown in the figure, corresponding to $\alpha = \pi$. The load is arranged at 22 in the figure. From the equation (16) and taking this case, there can then be deduced the equation (17) which is obtained by equating the second term of the equation (16) with the expression for the impedance of each of the circuits, namely $-j/C_s\omega$. In equation (16) the quantity $\omega_s$ appears and this is defined, like $\omega_r$, by the relationship $L_s \cdot C_s \cdot \omega_s^2 = 1$; $\omega_s$ is the radian frequency of each of the stator circuits, $L_s$ and $C_s$ respectively designating the inductance of each winding 2 and the value of each of the capacitance 20.

Equation (17) has complex roots in $\omega$ which indicate this machine is therefore the location of oscillations which build up with time.

For example, if the rotor drive speed u is such that $\beta u = \omega_s + \omega_r$, the value of the radian frequency $\omega$ given by equation (16) is that of formula (18). The machine behaves as a generator at the frequency $\omega$, and the generated currents can be picked off across a load connected to the stator at 22, as the diagram of FIG. 9 shows. This load could be the highly capacitive load of a low frequency radio broadcasting antenna, replacing all or possibly part of the previous capacitances 20.

A closer study of the solutions to equation (16), shows that it is possible in a general way to obtain frequency-modulated and amplitude-modulated currents by modifying either u, that is to say the rotor drive speed, or the coefficient of mutual inductance M. In the first case, the speed is influenced by mechanical or electrical means, and in the second the rotor is displaced in relation to the stator by appropriately structuring the machine.

The high rotational speeds required to obtain high frequencies, pose a problem of mechanical resistance on the part of the constituent elements of the machines in accordance with the invention.

Figure 10:
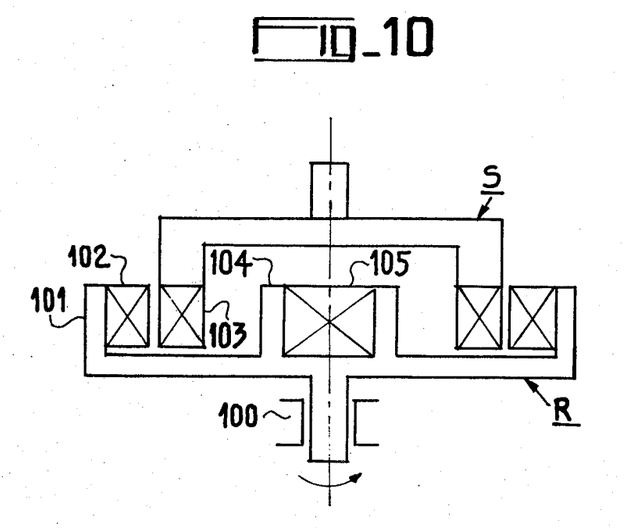
FIGS. 10, 11, 12 and 13 are examples of the structure of the machine in accordance with the invention.

An example of the structure of these machines has been shown schematically in FIG. 10. The rotor R, rotating about its axis in the bearing 100, has a rim 101 inside which part 102 of the rotor circuits is located, constituted for example by the inductors $L_r$ of these circuits, which are disposed opposite the stator windings. The remainder 105 of the rotor circuits, that is to say the capacitances $C_r$ taking the notation used earlier, is arranged inside the second rim 104; this figure does not show the connecting elements between the inductors and the capacitors of the rotor; 103 provides a general indication of the electrical elements of the stator. Because of the presence of the rim 101 this structure makes it possible to avoid the kinds of pulling away loads which centrifugal force would apply to the electric circuits.

In certain applications, it may be necessary to utilise for example capacitors $C_r$ located partly or wholly outside the poles of the rotor, these latter being too small to contain them. In this case, these fixed parts will be connected to the parts located inside the poles, by sliding contacts. This kind of situation may turn out to be necessary in the case of high power levels. The same also apply to some of the inductors.

Figure 11:
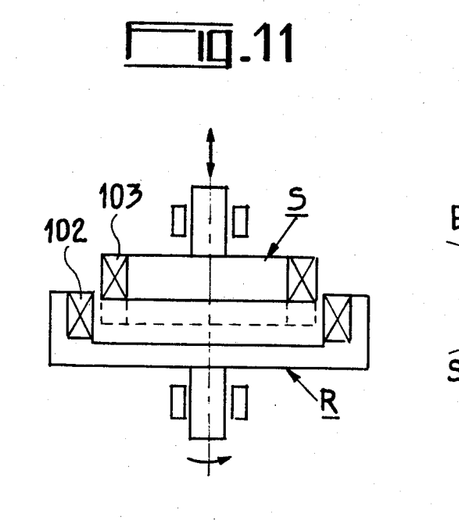
Figure 12:
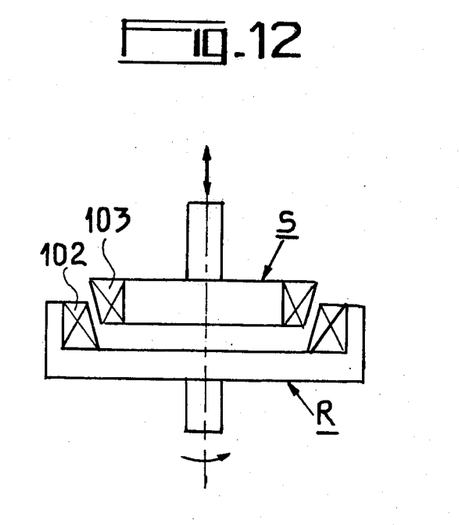

FIGS. 11 and 12 illustrate other examples of structures applicable to the case in which it is desired to vary the coupling between stator and rotor in order to effect frequency modulation or amplitude modulation as described earlier. This effect is achieved by displacing (double arrow) the stator in relation to the rotor along the machine axis, stator and rotor both being cylindrical (FIG. 11), or conical (FIG. 12).

Figure 13:
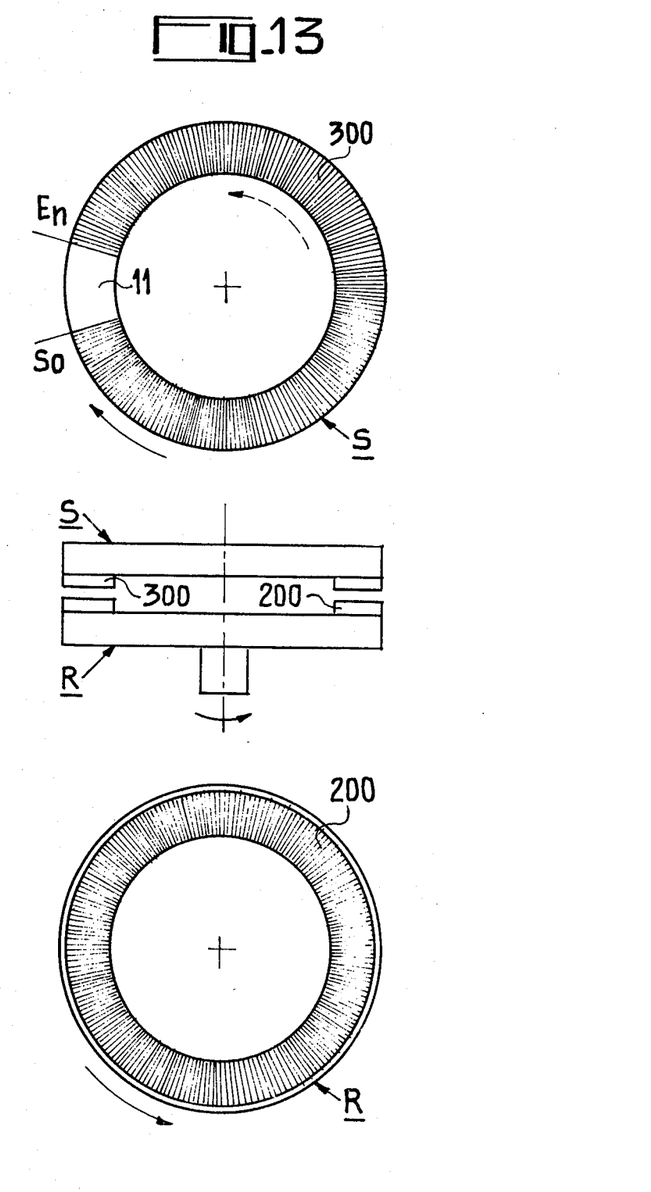

FIG. 13 illustrates a structure specially designed for machines built using printed circuit techniques, the stator S and the rotor R being discs upon face of which the circuits are printed. These circuits are indicated generally by the references 200 and 300. The two discs are located opposite one another, the bottom disc R, in operation, being made to rotate about its axis. The circuits occupy the whole of the circumference of the rotor R whilst on the stator they simply occupy a sector defined between the input En and the output So which are separated by the decoupling zone 11. This will be apparent from the plan views of stator and rotor respectively at top and bottom of the figure, these views having been obtained from the elevational view at the centre of the figure by a rotation of 90° upwards in the case of the stator and 90° downwards in the case of the rotor. The full-line arrows of these plan views, indicate, in the case of the rotor, the direction of rotation, and in the case of the stator, the direction of propagation of the direct wave corresponding to a phase velocity of the same sign as the group velocity. The broken line arrow indicates the direction of propagation in the stator, for reverse wave operation where, as indicated earlier, the phase and group velocities are of opposite signs.

Figure 14:
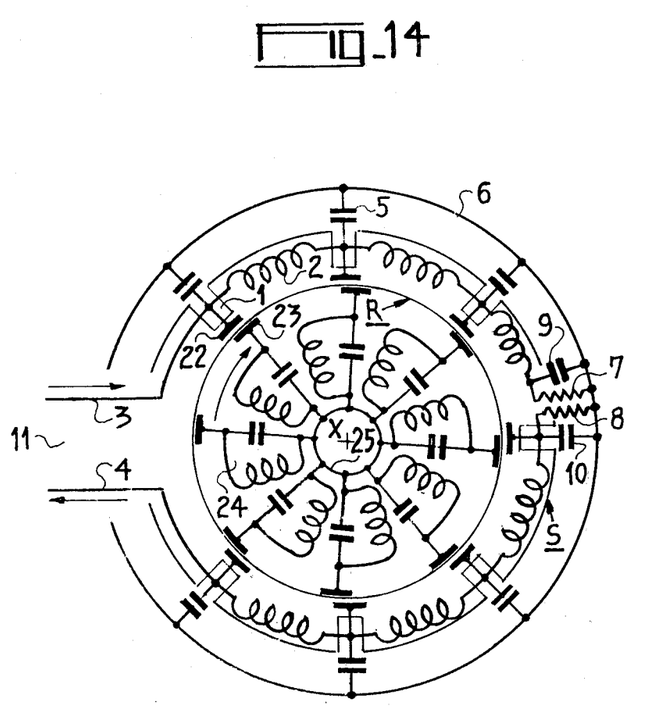
FIGS. 14 and 15 are a schematic views of other variant embodiments of the machine in accordance with the invention.

In the preceding examples, coupling between stator and rotor is effected by magnetic field. This coupling can also be produced by electrical influence between the conductors which are disposed opposite one another when the poles of the rotor pass in front of those of the stator. This arrangement has been shown schematically in FIG. 14 which illustrates the variant embodiment of FIG. 6, in accordance with the invention, for the case where this kind of coupling by electrical influence is used. In FIG. 14, similar reference designate similar elements to those indicated in FIG. 6; as in this figure, the stator has been schematically illustrated by its poles whilst the rotor is limited to the circle marked R. The oscillatory circuits of the rotor are distributed thereon at the rate of 1 circuit per pole. In the FIG. 22 and 23 respectively designate the conductors of stator and rotor, between which coupling is established during rotor displacement, and 24 indicates each of the oscillatory circuits of the rotor which are connected to the common conductor 25.

Figure 15:
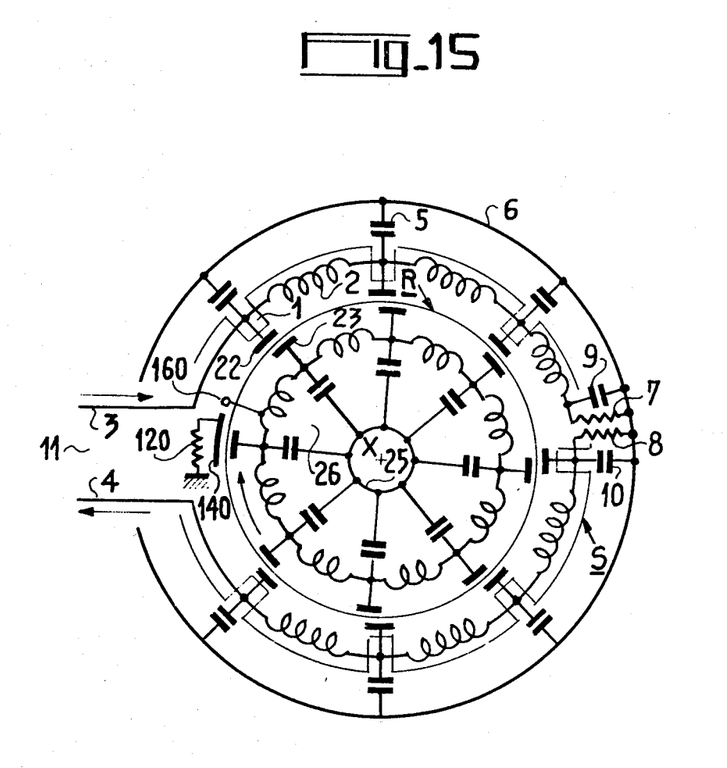

In the foregoing examples, it has been assumed that the inductors and the charge accumulating elements of the rotor, constitute separate oscillatory circuits. In other variant embodiments of the invention, they are arranged in order to form filter as shown in FIG. 15 for the case of coupling by electrical influence. In this figure, similar references designate elements similar to those so marked in FIG. 14. The machine operates under conditions similar to those of the machines of FIGS. 6 and 8. As before, damping of the networks 26 of the rotor is provided for, when they pass through the zone 11, damping being effected for example by means of a rail 140 connected across a resistor 120 to earth, to said rail the terminal 160 of each of the networks being applied at the time that the network passes through said zone.

$$\phi_s = L_s I_s + M I_r \tag{1}$$

$$\phi_r = M I_s + L_r I_r \tag{2}$$

$$V_s = j\omega L_s I_s + j\omega M I_r \tag{3}$$

$$V_r = j\omega_3 M I_s + j\omega_3 L_r I_r \tag{4}$$

$$\omega_3 = \omega - \beta u \tag{5}$$

$$V_r + \frac{I_r}{jC_r\omega_3} = 0 \tag{6}$$

$$\frac{V_s}{I_s} = -\frac{2}{jC_s\omega}(1-\cos\alpha) \tag{7}$$

$$I_s\left[jL_s\omega + \frac{2}{jC_s\omega}(1-\cos\alpha)\right] + j\omega M I_r = 0 \tag{8}$$

$$jM\omega_3 I_s + j(L_r\omega_3 - \frac{1}{C_r\omega_3})I_r = 0 \tag{9}$$

$$\frac{1}{L_r C_r \omega_3^2} = 1 - \frac{\frac{M^2}{L_r L_s}}{1 - \frac{2}{L_s C_s \omega^2}(1-\cos\alpha)} \tag{10}$$

$$\frac{1}{L_r C_r \omega_3^2} = 1 - \frac{\frac{M^2}{L_r L_s}}{1 - \frac{\beta^2 p^2}{L_s C_s \omega^2}} \tag{11}$$

$$\left[(\omega - \beta u)^2 L_r C_r - \frac{1}{1 - \frac{M^2}{L_r L_s}}\right](\beta^2 - \beta_o^2) = -\beta^2 \frac{\frac{M^2}{L_r L_s}}{1 - \frac{M^2}{L_r L_s}} \tag{12}$$

$$\frac{1}{L_r C_r} \cdot \frac{1}{1 - \frac{M^2}{L_r L_s}} = 4QC^3 u^2 \beta^2 \tag{13}$$

$$\beta_o^2 C^3 = \frac{1}{2} \frac{1}{L_r C_r u^2} \cdot \frac{M^2}{L_r L_s - M^2} \tag{14}$$

$$[(\omega - \beta u)^2 L_r C_s - 1](\beta - \beta_o) = \frac{\beta_o}{2} \frac{M^2}{L_s L_r - M^2} \tag{15}$$

$$Z_s = jL_s\omega - j\frac{M^2\omega}{L_r} \frac{\omega'^2}{\omega_3^2 - \omega_r^2} \tag{16}$$

$$(1 - \frac{\omega_s^2}{\omega^2})(1 - \frac{\omega_r^2}{\omega_3^2}) = \frac{M^2}{L_r L_s} \tag{17}$$

$$\omega = \omega_s \pm j\frac{M}{2}\sqrt{\frac{\omega_s\omega_r}{L_s L_r}} \tag{18}$$

What is claimed is:

1. An electrical machine comprising a fixed part, or stator, and a rotor, both equipped with poles, said rotor displacing in relation to said stator in such a fashion that its poles pass in front of those of the stator, said stator and said rotor comprising electrical elements in each of their poles, through which the rotor poles are electromagnetically coupled with the stator poles at the instant at which they pass in front of each of same, said rotor comprising both inductors and elements which accumulate electricl charges, forming oscillatory circuits which are not coupled with each other, i.e., not in a transmission line, said circuits being associated with each of said rotor poles, at the rate of one circuit per pole, said oscillatory circuits being localized in part at least within said rotor poles, said stator comprising reactive elements, localized in part at least within said stator poles, and resistive elements connected between two conductors forming a line with two input terminals at one of its ends and two output terminals at the other end.

2. An electrical machine as claimed in claim 1, wherein said electrical elements are inductors, said coupling taking place by a magnetic induction between said inductors.

3. An electrical machine as claimed in claim 1, wherein said electrical elements are conductors disposed mutually opposite one another when the poles of the rotor pass in front of those of the stator, said coupling taking place through the agency of electrical influence between said conductors.

4. An electrical machine as claimed in claim 1, wherein said stator and said rotor comprise the same number of poles, uniformly distributed on each of them.

5. An electrical machine as claimed in claim 1, wherein said stator and said rotor are circular in shape and disposed about a common axis, said displacement being a motion of rotation about said axis, said stator being a low-pass filter comprising an inductor in each of its poles, said inductors being arranged in series between an input conductor located upstream considering the direction of rotational motion of the rotor, and an output conductor located downstream considering same rotational motion, there being furthermore a common conductor, capacitors and connecting means linking of each of said capacitors to the common point between two successive inductors and to said common conductor, and there being resistive elements in order to damp each of the networks of said filter, said machine further comprising in the space located between said input and output conductors, means for damping each of said oscillator circuits of the rotor at the instant at which it passes through said space and means for applying between said common conductor and said input conductor, an alternating electric source.

6. An electrical machine as claimed in claim 5, further comprising means for imparting said displacement to said rotor and a load connected between said common conductor and said output conductor, said machine operating as a power-amplifier, vis-a-vis said alternating electrical source, said amplified power being dissipated in said load.

7. An electrical machine as claimed in claim 5, operating as a motor and imparting said displacement to the rotor.

8. An electrical machine as claimed in claim 6, wherein said stator comprises a total or two poles, one located close to said input conductor and the other close to said output conductor.

9. An electrical machine as claimed in claim 7, wherein said source is a high-frequency source stabilized by crystal control, the machine operating as a motor possessing very high speed stability.

10. An electrical machine as claimed in claim 5, wherein said damping means consist of a resistor connected between two conductor rails and of sliding contacts fitted to said oscillatory circuits and applied to said conductor rails when each of said circuits passes through the space defined between the input conductor and the output conductor.

11. An electrical machine as claimed in claim 1, wherein said stator and said rotor are circular in shape and are disposed about a common axis, said displacement being a rotational motion about said axis, said stator being a high-pass filter comprising an inductor in each of its poles, said inductors being connected in parallel with one another by a first conductor and by a second conductor comprising two ends, one upstream and the other downstream considered in relation to said rotational motion, capacitors being arranged in said second conductor between two consecutive inductors, said machine further comprising in the space defined between two said ends, means for damping each of said oscillatory circuits of the rotor at the instant at which it passes through said space, and means for applying in alternating electrical source between one of said ends and said first conductor, and a load between the other end of said first conductor.

12. An electrical machine as claimed in claim 11, further comprising means for imparting said displacement to said rotor, said source being applied to that of the ends located downstream, and the load to the other, said machine operating as a power-amplifier vis-a-vis said high-frequency source and said amplified power being dissipated in said load.

13. An electrical machine as claimed in claim 1, wherein said stator and said rotor are circular in shape and are disposed around a common axis, said displacement being a rotary motion about said axis, said stator being a high-pass filter comprising an inductor in each of its poles, said inductors being connected in parallel with one another by a first conductor and by a second conductor comprising two ends, one upstream and the other downstream considered in relation to said rotational motion, and capacitors being provided in said second conductor between two consecutive inductors, said machine further comprising in the space defined between the sid two ends, means for damping said oscillatory circuits of the rotor at the instant at which they pass through said space, and means for imparting said displacement to said rotor, said downstream end and that end of said first conductor which is adjacent thereto, being connected together across the characteristic impedance of said stator, said machine operating as an oscillator whose output is located at the upstream end.

14. An electrical machine as claimed in claim 1, wherein said stator and said rotor are circular in shape and arranged around a common axis, said displacement being a rotational motion about said axis, said stator being a high-pass filter comprising an inductor in each of its poles, said inductors being connected in parallel with one another by a first conductor and by a second conductor having two ends, one upstream and the other downstream considered in relation to said rotational motion, and capacitors being provided in said common conductor between two consecutive inductors, said machine further comprising in the space defined between the two said ends, means for damping each of said oscillatory circuits of the rotor at the instant at which it passes through said space, and means for applying an alternating electrical source, between said downstream end and that end of said first conductor which is adjacent thereto, said machine operating as a motor imparting said displacement to the rotor.

15. An electrical machine as claim in claim 1, wherein said stator comprises oscillatory circuits at the rate of one circuit per pole, connected, in a regularly alternating manner, to a polyphase circuit which is itself connected to a load, and further comprising means for imparting said displacement to said rotor, said machine operating as a generator generating a polyphase current in said load.

16. An electrical machine as claimed in claim 1, wherein said stator comprises oscillatory circuits at the rate of one circuit per pole, whose terminals of opposite sign are connected in each case to one of the conductors of a set of two conductors, terminals of the same sign belonging to said circuits being alternately connected to one or the other of said conductors; said machine further comprising a load and means for connnection said load between said two conductors, and means for imparting said displacement to said rotor, said machine operating as a generator generating a two-phase current in said load.

17. An electrical machine as claimed in claim 5, wherein said alternating electrical source is a high-frequency source.

18. An electrical machine as claimed in claim 11, wherein said alternating electrical source is a high-frequency source.

19. An electrical machine as claimed in claim 14, wherein said alternating electrical source is a high-frequency source.

20. An electrical machine as claimed in claim 1, wherein said rotor inductors and said elements for accumulating electrical charges, form separate oscillatory circuits.

21. An electrical machine as claimed in claim 1, wherein said rotor inductors and said elements for accumulating electrical charges, are the elements of a filter which is closed at both ends.

22. An electrical machine as claimed in claim 1, wherein said stator and said rotor are circular in shape and disposed about a common axis, said displacement being a motion of rotation about said axis, said stator being a low-pass filter comprising an inductor in each of its poles, said inductors being arranged in series between an input conductor located upstream considering the direction of rotational motion of the rotor, and an output conductor located downstream considering same rotational motion, there being furthermore a common conductor, capacitors and connecting means linking each of said capacitors to the common point between two successive inductors and to said common conductor, and there being resistive elements in order to damp each of the networks of said filter, and means for applying between said common conductor and said input conductor, an alternating electric source.

* * * * *